US006598822B2

(12) United States Patent
Nagata et al.

(10) Patent No.: US 6,598,822 B2
(45) Date of Patent: Jul. 29, 2003

(54) WEBBING RETRACTOR

(75) Inventors: Tomonori Nagata, Aichi-ken (JP); Yasuho Kitazawa, Aichi-ken (JP); Shinji Mori, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 90 days.

(21) Appl. No.: 09/983,553

(22) Filed: Oct. 24, 2001

(65) Prior Publication Data

US 2002/0050542 A1 May 2, 2002

(30) Foreign Application Priority Data

Oct. 26, 2000 (JP) ........................................ 2000-327751

(51) Int. Cl.$^7$ ................................................ B65H 75/48
(52) U.S. Cl. ...................... 242/379.1; 242/384; 280/806
(58) Field of Search .............................. 242/379.1, 384, 242/396.1, 396.4; 280/805, 806, 807; 297/472, 475

(56) References Cited

U.S. PATENT DOCUMENTS

| | | | | |
|---|---|---|---|---|
| 3,561,690 A | * | 2/1971 | Muskat ..................... 242/379.1 |
| 4,088,280 A | * | 5/1978 | Arlauskas et al. ........ 242/379.1 |
| 4,323,205 A | * | 4/1982 | Tsuge et al. .............. 242/379.1 |
| 5,618,006 A | * | 4/1997 | Sayles ...................... 242/379.1 |
| 5,779,176 A | | 7/1998 | Hori et al. |
| 5,934,597 A | * | 8/1999 | Ludwig ..................... 242/379.1 |
| 6,206,316 B1 | * | 3/2001 | Kielwein et al. ......... 242/379.1 |
| 6,216,972 B1 | * | 4/2001 | Rohrle ...................... 242/379.1 |
| 6,311,918 B1 | * | 11/2001 | Specht ...................... 242/379.1 |
| 6,367,728 B1 | * | 4/2002 | Wigstrom ................. 242/379.1 |

* cited by examiner

Primary Examiner—William A. Rivera
(74) Attorney, Agent, or Firm—Nixon Peabody LLP; Thomas W. Cole

(57) ABSTRACT

A webbing retractor is disclosed. One end portion of a plate is fixed to a hollow cylindrical portion of a spool. An intermediate portion of the plate is entrained around an engaging pin and the like of a gear which can rotate relatively to the spool. A pawl provided at the gear abuts the plate, and is held at a position of non-engagement with stopper teeth against urging force of a coil spring. When the spool and the gear rotate relatively, the plate, whose widthwise dimension decreases toward a final end portion thereof, is taken-up onto the hollow cylindrical portion while being rubbed by the engaging pin and the like. A force limiter load in an energy absorbing process is decreased. The pawl, whose engagement with the plate is released, meshes with the stopper teeth such that rotation of the spool is impeded.

20 Claims, 12 Drawing Sheets

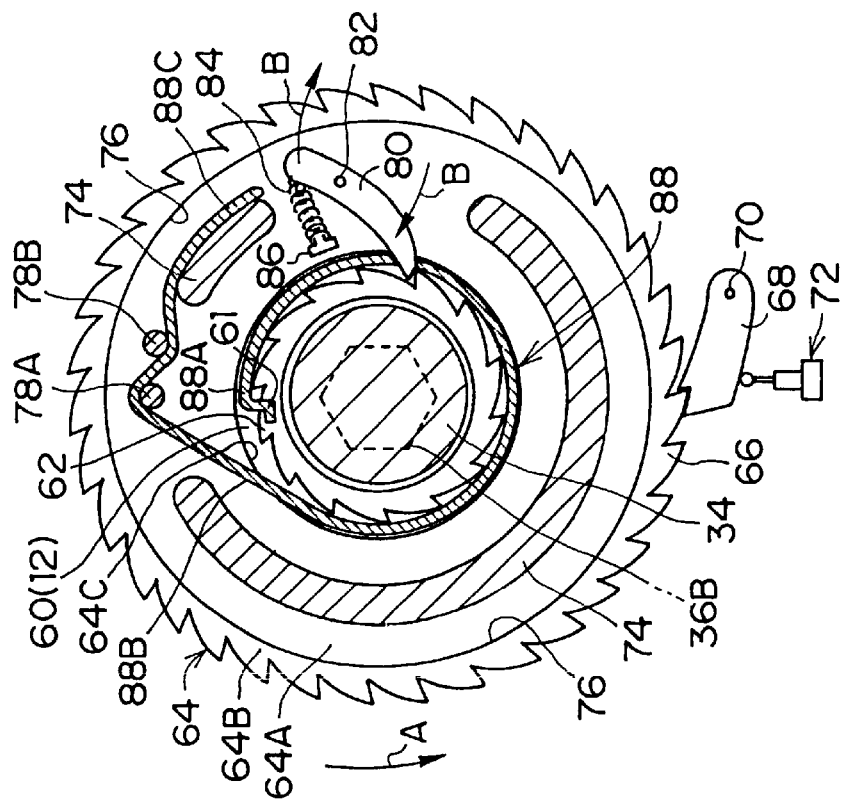
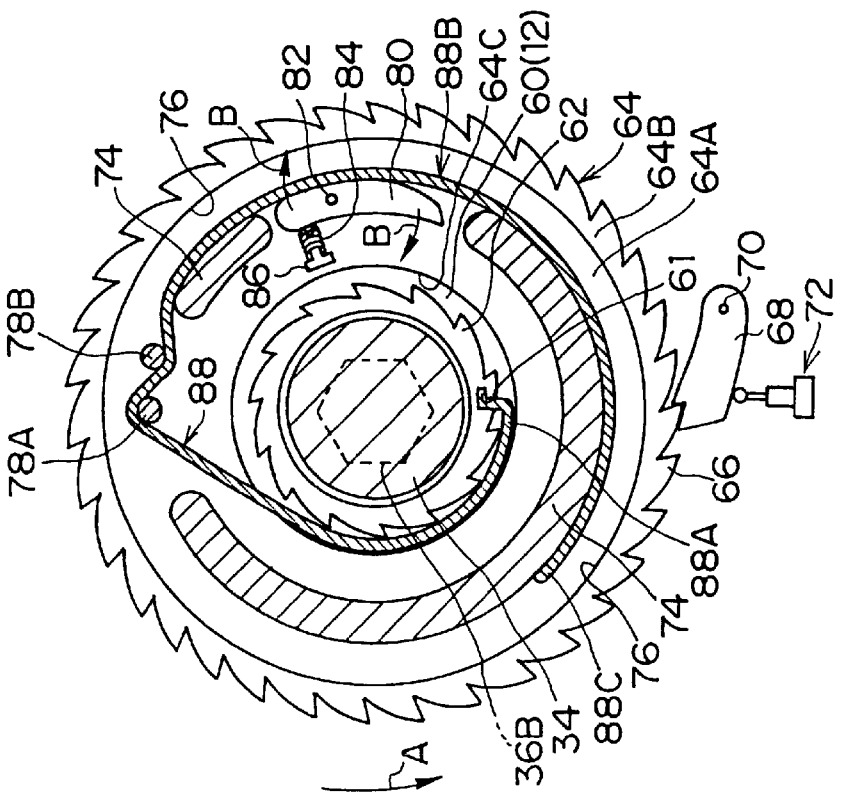

WEBBING RETRACTOR

BACKGROUND OF THE INVENTION

1. Field of the Invention

The present invention relates to a webbing retractor, and in particular, to a webbing retractor which permits pulling-out of a webbing and absorbs energy at the time when pulling-out of the webbing is impeded.

2. Description of the Related Art

In a webbing retractor, rotation of a spool (take-up shaft) in a webbing pull-out direction is locked at the time the vehicle rapidly decelerates, such that pulling-out of the webbing is impeded. As the lock mechanism, a lock device is disposed in the vicinity of a device frame at one end side of the spool. Due to this lock mechanism being operated at the time the vehicle rapidly decelerates, rotation of the spool in the webbing pull-out direction is impeded.

Further, in such a webbing retractor, at the time that pulling-out of the webbing is impeded, pulling-out of a predetermined amount of the webbing is permitted so as to aim for energy absorption. An example of the energy absorbing mechanism is a structure in which a torsion bar is provided coaxially with the spool. Generally, one end portion of a torsion bar is connected to the spool so as not to rotate relatively thereto. The other end portion of the torsion bar is connected to a lock base, which is connected to a lock mechanism, such that this other end portion does not rotate relatively to the lock base. Usually, the spool and the lock base rotate integrally via the torsion bar. However, in a state in which rotation of the lock base in the webbing pull-out direction is impeded at the time when the vehicle rapidly decelerates, the spool rotates in the webbing pull-out direction with respect to the lock base due to the tensile force of the webbing. At this time, the torsion bar twists such that energy is absorbed, and a predetermined amount of rotation of the spool is permitted.

Moreover, an example of a stopper device for limiting, to a predetermined amount, the amount of rotation of the spool which accompanies energy absorption is a structure which is provided with a lock nut which screws together with the outer peripheral portion of the lock base and which is moved in the axial direction by rotating integrally with the spool. When the lock nut abuts the end surface of the lock base such that movement of the lock nut in the axial direction is impeded, further rotation of the spool is impeded.

However, in such a conventional webbing retractor, there are the problems that the structure of the stopper device is complex, and the assembly processes are complicated and expensive.

Further, for example, in a vehicle equipped with an air bag device, it is preferable to provide a gradually changing device by which the load applied to the vehicle occupant from the webbing in the energy absorbing process (i.e., the force limiter load) is gradually reduced, so as to suppress the total load applied to the vehicle occupant from the air bag device and the webbing. However, in a webbing retractor such as that described above, the force limiter load is a constant value due to the properties of the material of the torsion bar and the dimensions and configuration of the torsion bar. It is difficult to gradually decrease the force limiter load (i.e., to provide a gradually changing device).

SUMMARY OF THE INVENTION

In view of the aforementioned, an object of the present invention is to provide a webbing retractor whose structure is simple, and which can limit the webbing pull-out amount at the time of energy absorption, and which can reduce the force limiter load in the energy absorbing process.

In order to achieve the above object, a webbing retractor of the present invention comprises: a spool on which a webbing is taken-up and from which a webbing is pulled-out; a rotating member provided so as to be coaxial with the spool and so as to be rotatable relative to the spool, the rotating member usually rotating integrally with the spool, and in predetermined cases, rotation of the rotating member in a webbing pull-out direction is impeded; an elongated member whose one end portion is fixed to one of the spool and the rotating member, and whose intermediate portion is engaged with another of the spool and the rotating member, and when rotation of the rotating member in the webbing pull-out direction is impeded, accompanying relative rotation of the spool and the rotating member, the elongated member is rubbed or drawn at an engaged region thereof; and stopper device provided at the other of the spool and the rotating member so as to abut the intermediate portion of the elongated member, and when, accompanying relative rotation of the spool and the rotating member, a state of abutment of the stopper device with the elongated member is cancelled, the stopper device impedes relative rotation, in the webbing pull-out direction, of the spool with respect to the rotating member.

In the webbing retractor, because the rotating member usually rotates integrally with the spool, the webbing is freely taken-up and pulled-out. At this time, because no relative rotation arises between the spool and the rotating member, the stopper device does not operate.

In a predetermined case such as, for example, when the vehicle rapidly decelerates or the like, when rotation of the rotating member in the webbing pull-out direction is impeded, relative rotation arises between the rotating member and the spool to which tensile force of the webbing is applied and which is rotated in the webbing pull-out direction. Accompanying this relative rotation, the elongated member is rubbed. The accompanying drawing load is applied as force limiter load, and energy absorption is thereby achieved.

Further, when, accompanying the relative rotation, the state of abutment of the elongated member and the stopper device is cancelled, the stopper device is operated such that relative rotation of the spool in the webbing pull-out direction with respect to the rotating member is impeded. At this time, because rotation of the rotating member in the webbing pull-out direction is impeded, rotation of the spool in the webbing pull-out direction is impeded, and further pulling out of the webbing is restricted.

Here, the elongated member is merely fixed to one of the spool and the rotating member and engaged to the other of the spool and the rotating member. Operation of the stopper device is restricted merely by the stopper device being abutted by the intermediate portion of the elongated member. (Namely, the elongated member, which serves as an energy absorbing member, also works as a trigger for operating the stopper device.) Thus, the structure is simple. Further, by providing these components at the outer side of one end of the spool, there is no need to assemble lock nuts or the like in the interior of the spool as in the conventional art, and the assembly process as well is simplified.

In this way, in the webbing retractor, the structure is simple, the pulled-out amount of the webbing at the time of energy absorption can be limited.

For example, a rotation impeding device which is structured so as to include a driving device, which is operated when an acceleration sensor detects a predetermined acceleration, and a pawl, which is connected to the drive device and which, when the drive device is operated, engages with a lock tooth formed at the outer peripheral portion or the like of the rotating member, may be used as the device for impeding rotation of the rotating member in the webbing pull-out direction in predetermined cases.

In the webbing retractor, preferably, the elongated member is disposed between an outer peripheral portion of the one of the spool and the rotating member and an inner peripheral portion of the other of the spool and the rotating member which outer peripheral portion and inner peripheral portion oppose one another, and accompanying relative rotation of the spool and the rotating member, the elongated member is taken-up onto the outer peripheral portion of the one of the spool and the rotating member.

In the above-mentioned webbing retractor, the elongated member is provided between the outer peripheral portion of one of the spool and the rotating member and the inner peripheral portion of the other of the spool and the rotating member, which outer peripheral portion and inner peripheral portion oppose one another. Thus, the elongated member can be made compact by being formed, for example, in a circular arc shape or a coiled form, and the degrees of freedom in setting the length of the elongated member (the amount of rotation of the spool which is permitted at the time of energy absorption) are increased.

The elongated member is taken-up on the outer peripheral surface of the one of the spool and the rotating member to which one end portion of the elongated member is fixed. Thus, in the energy absorbing process, the direction of pulling at the region which is engaged with the other of the spool and the rotating member is substantially constant, and a stable rubbing force (force limiter load) can be obtained. In particular, if the fixed region of the one end portion of the elongated member is disposed such that the phase thereof in the direction of relative rotation is ahead of that of the engaged region so that the elongated member take-up direction in the initial stages substantially coincides with the direction of a tangent line connecting the engaged region and the outer peripheral surface, the pulling direction is always substantially constant from the initial stages of energy absorption, and such a structure is even more suitable.

In this way, in the webbing retractor, the structure is even more simple, the pulled-out amount of the webbing at the time of energy absorption can be limited, and the force limiter load is stable.

In the webbing retractor, more preferably at the elongated member, a sectional area of the intermediate portion which is rubbed or drawn at least at the engaged region decreases gradually toward another end portion of the elongated member.

In the above-mentioned webbing retractor, the sectional area of the rubbed portion of the elongated member, which moves relative to the engaged region as the spool and the rotating member rotate relatively, gradually decreases from the fixed one end portion toward the other end portion. Thus, the force limiter load in the energy absorbing process gradually decreases.

In this way, in the above-mentioned webbing retractor, the structure is simple, the pulled-out amount of the webbing at the time of energy absorption can be limited, and the force limiter load in the energy absorbing process is reduced.

Preferably, any of the above-mentioned webbing retractors further comprises: a lock base provided at one end side of the spool so as to be coaxial with the spool and so as to be able to rotate relatively with respect to the spool, and when one of a rapid deceleration of a vehicle and rapid pulling-out of a webbing is sensed, rotation of the lock base in the webbing pull-out direction is impeded by a locking device; and a torsion bar provided within the spool and coaxially with the spool, one end portion of the torsion bar being connected to the spool and another end portion of the torsion bar being connected to the lock base, the torsion bar usually being made to rotate integrally with the spool and the lock base, and when rotation of the lock base in the webbing pull-out direction is impeded, the torsion bar, while twisting due to tensile force of the webbing, rotates the spool in the webbing pull-out direction relatively to the lock base.

In the above-mentioned webbing retractor, as the energy absorbing member, a torsion bar is provided in addition to the elongated member. At the time when a rapid deceleration of the vehicle or rapid pulling-out of the webbing is sensed, when the rotation of the lock base in the webbing pull-out direction is impeded by the locking device, the torsion bar, while twisting, permits rotation of the spool in the webbing pull-out direction. The twisting load of the torsion bar is added to the force limiter load.

Thus, the elongated member can be made compact, the respective energy absorbing members can be arranged in a well-balanced manner within the webbing retractor, and the webbing retractor can, on the whole, be made compact and lightweight. Further, as compared with a structure, in which energy absorption is carried by only a torsion bar as in the conventional art, a stopper device and a gradually changing device can be obtained with a simple structure.

Moreover, for example, if a structure is provided in which the rotation of the rotating member in the webbing pull-out direction can be impeded at arbitrary times (i.e., if a structure is provided in which the predetermined cases can be set separately from the time of operating the locking device), a different force limiter load can be selected in advance or in the energy absorbing process.

In this way, in the above-mentioned webbing retractor, the structure is simple, the pulled-out amount of the webbing at the time of energy absorption can be limited, the force limiter load in the energy absorbing process is reduced, and the webbing retractor is made to be compact.

In the webbing retractor, more preferably, the lock base also functions as the rotating member.

In the above-mentioned webbing retractor, when rotation of the lock base in the webbing pull-out direction is impeded, the torsion bar, to which the tensile force of the webbing is applied, twists, and the spool and the lock base rotate relatively. Accompanying this relative rotation, the elongated member is rubbed, and the torsion bar and the elongated member simultaneously operate as energy absorbing members, and energy absorption is achieved. Thus, the amount of rotation of the spool (the pull-out amount of the webbing) which is permitted at the time of energy absorption can always be maintained constant.

Here, because the lock base also serves as the rotating member, the number of parts can be reduced (the rotating member itself and the mechanism for impeding rotation of the rotating member in the webbing pull-out direction can be eliminated). The structure becomes more simple, the assembly process becomes more simple, and the webbing retractor can be made compact and lightweight.

In this way, in the above-mentioned webbing retractor, the structure is even more simple, and the webbing pull-out amount at the time of energy absorption can be reliably limited. Further, the force limiter load in the energy absorbing process is reduced, and the webbing retractor is made to be even more compact.

BRIEF DESCRIPTION OF THE DRAWINGS

FIG. 7A is a side view, corresponding to FIG. 4, which shows an energy absorbing process.

FIG. 7B is a side view, corresponding to FIG. 4, which shows an operated state of the stopper device.

DESCRIPTION OF THE PREFERRED EMBODIMENTS

A webbing retractor 10 relating to a first embodiment of the present invention will be described hereinafter on the basis of FIGS. 1 through 8. Note that the direction of arrow A is a webbing pull-out direction (direction of rotation) in FIGS. 2, 4, 7A and 7B.

Figure 1:
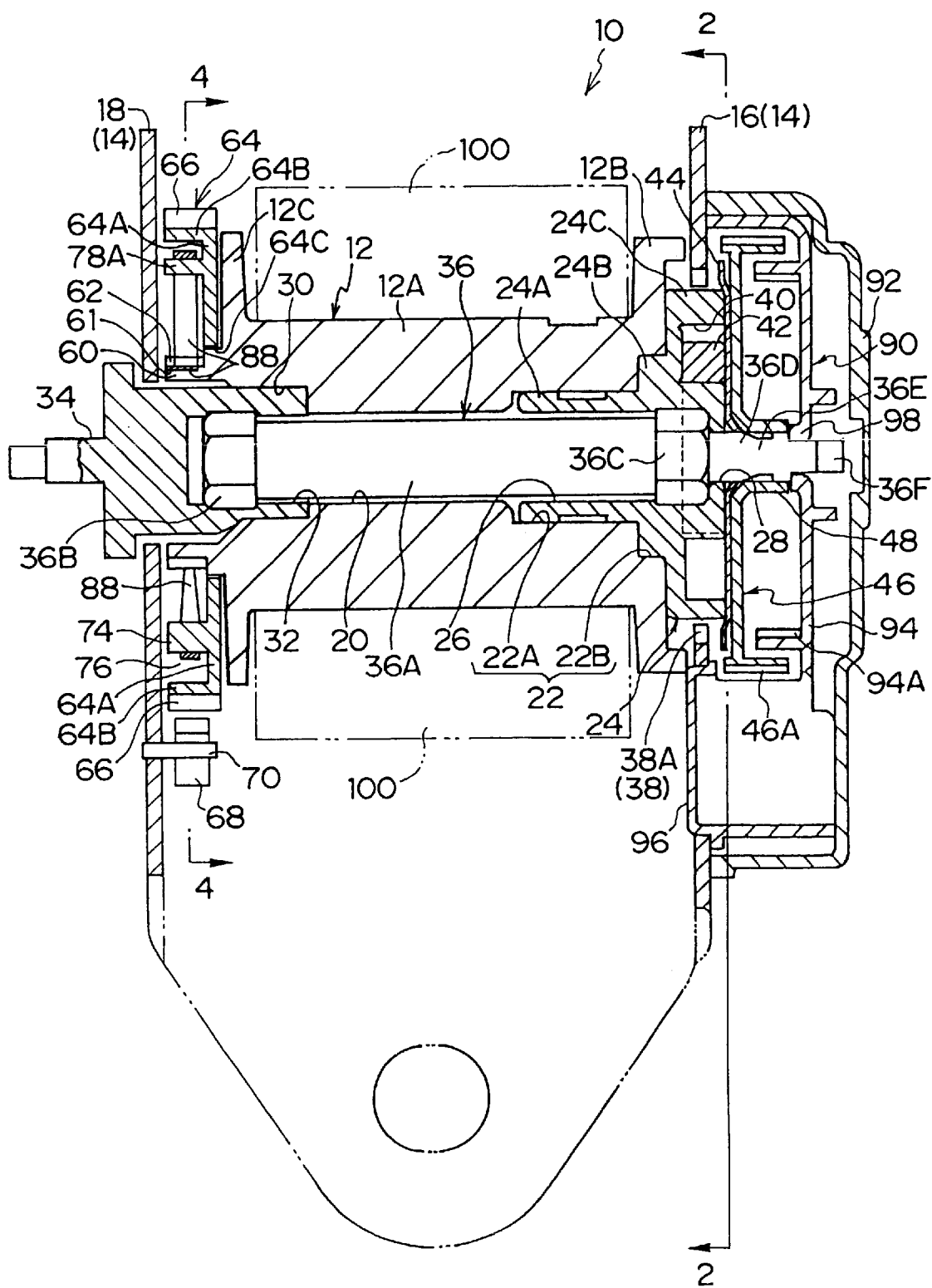
FIG. 1 is a schematic sectional view showing the overall structure of a webbing retractor relating to a first embodiment of the present invention.

The overall structure of the webbing retractor 10 relating to the present embodiment is shown in sectional view in FIG. 1. As is shown in FIG. 1, the webbing retractor 10 has a frame 14 which is substantially U-shaped as seen in plan view. The frame 14 is fixed to a vehicle body. The frame 14 has a first leg plate 16 and a second leg plate 18 which extend parallel to one another. A spool 12, which is formed by die casting, is rotatably supported between the first leg plate 16 and the second leg plate 18.

The spool 12 is formed by a spool shaft 12A which is shaped as a hollow cylinder and forms an axially central portion, and a pair of flange portions which are formed in substantial disc shapes at the both end portions of the spool shaft 12A. (Hereinafter, the flange portion which is disposed at the first leg plate 16 side will be called a "first flange portion 12B", and the flange portion which is disposed at the second leg plate 18 side will be called a "second flange portion 12C".) The spool 12 is formed on the whole in a drum-like shape. One end of a webbing 100 is anchored on the spool shaft 12A of the spool 12. Due to the spool 12 rotating, the webbing 100 can be freely taken-up and pulled-out with respect to the spool 12.

A shaft through hole 20 is formed in the axially central portion of the spool shaft 12A. A lock base receiving portion 22, which is formed as a recess portion and whose diameter is greater than that of the shaft through hole 20, is formed coaxially at the first flange portion 12B side at the shaft through hole 20. The lock base receiving portion 22 is formed by a recess portion main body 22A which takes up the majority of the lock base receiving portion 22, and a recess portion final end portion 22B whose diameter is greater than that of the recess portion main body 22A.

A lock base 24 is mounted in the lock base receiving portion 22 so as to be unable to be removed therefrom. As the method for mounting the lock base 24, a method is employed in which, after the lock base 24 is inserted into the lock base receiving portion 22, a stopper (removal preventing member), which is not illustrated and which is formed in a substantial U-shape as seen in front view, is press-fit in from a direction orthogonal to the axis of the spool shaft 12A.

The lock base 24 is formed in the shape of a hollow cylinder having a collar, and is formed by a base portion 24A, an intermediate portion 24B, and a holding portion 24C. The base portion 24A is fit in the hollow portion main body 22A of the lock base receiving portion 22. The intermediate portion 24B has a larger diameter than that of the base portion 24A, and is fit into the recess portion final end portion 22B of the lock base receiving portion 22. The holding portion 24C has a larger diameter than that of the intermediate portion 24B, and is disposed in a state of abutting the outer side surface of the first flange portion 12B. A hexagonal hole shaped fitting hole 26 is formed in the lock base 24 at a portion thereof other than the axially central portion outer end. Further, a small hole 28, which communicates with the axially central portion of the fitting hole 26 and whose diameter is smaller than that of the fitting hole 26, is formed in the axially central portion outer end of the lock base 24.

A sleeve receiving portion 30, which is formed in the shape of a recess portion and whose diameter is larger than that of the shaft through hole 20, is formed in the second flange portion 12C side of the shaft through hole 20 of the spool shaft 12A. A female spline is formed in the inner peripheral portion of the sleeve receiving portion 30. A sleeve 34, at whose outer peripheral portion a male spline is formed and in whose axially central portion a hexagonal hole shaped fitting hole 32 is formed, is fit into the sleeve receiving portion 30. The inner end of an urging device (a power spring), which urges and rotates the spool 12 in the webbing take-up rotating direction, is anchored via an adapter (not shown) to the distal end portion of the sleeve 34. The sleeve 34 which has the above-described structure is one of the structural parts of a pretensioner which instantaneously rotates the spool 12 in the webbing take-up rotating direction when the vehicle rapidly decelerates.

The lock base 24 and the sleeve 34 are connected together by a torsion bar 36. The torsion bar 36 is formed by a shaft portion 36A which forms the main portion of the torsion bar 36; a head portion 36B which is hexagonal and is formed at one end portion of the shaft portion 36A; a fitting portion 36C which is hexagonal and is formed at the other end portion of the shaft portion 36A; a small diameter portion 36D which extends from the axially central portion of the fitting portion 36C so as to be coaxial with the shaft portion 36A; a gear holding portion 36E whose diameter becomes narrow along a taper surface from the small diameter portion 36D, and thereafter, the diameter thereof increases in an annular shape; and a distal end portion 36F which extends coaxially from the gear holding portion 36E and at which a key is formed. The head portion 36B of the torsion bar 36 is fit into the hexagonal hole shaped fitting hole 32 formed in the sleeve 34, and the fitting portion 36C of the torsion bar 36 is fit into the hexagonal hole shaped fitting hole 26 formed in the lock base 24. In this way, the torsion bar 36 is integral with the spool shaft 12A via the lock base 24 and the sleeve 34.

Figure 2:
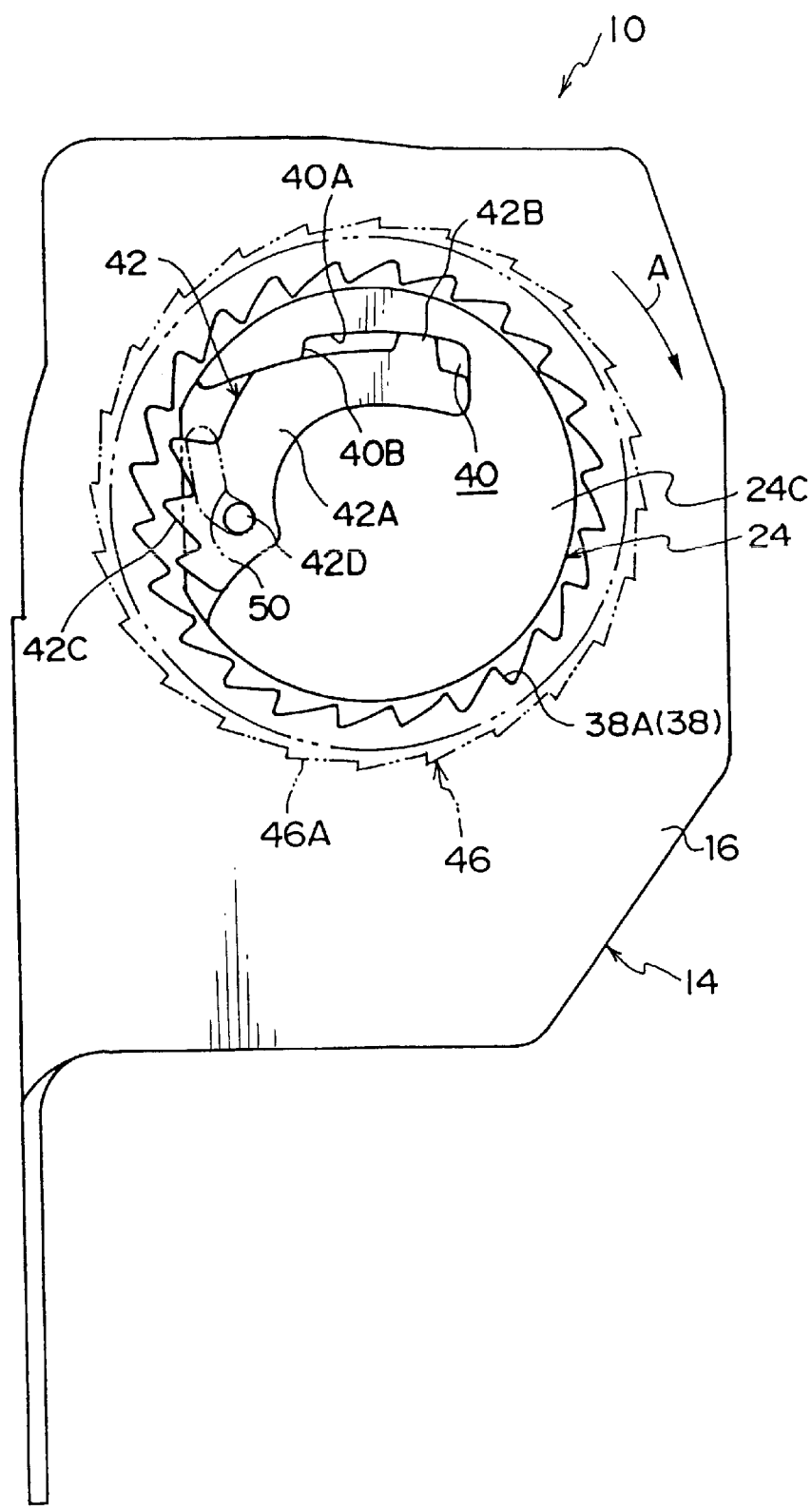
FIG. 2 is a side view as seen from the direction along line 2—2 of FIG. 1.

As shown in FIG. 2, an internal ratchet 38 is formed by punching in the upper portion side of the first leg plate 16 of the frame 14. Ratchet teeth 38 of the internal ratchet 38 are set to have high strength.

The holding portion 24C of the lock base 24 is disposed at the radial direction inner side of the internal ratchet 38. The small diameter portion 36D of the torsion bar 36 is inserted in the small hole 28 formed in the axially central portion of the holding portion 24C. A concave accommodating portion 40, which is formed in the peripheral direction around the small hole 28, is formed at the outer surface side of the holding portion 24C. One end portion of the accommodating portion 40 is closed, and the other end portion of the accommodating portion 40 is open. The other end portion side of the accommodating portion 40 of the holding portion 24C of the lock base 24 is chamfered so that an engaging movement of a lock plate 42, which will be described next, with the internal ratchet 38 is not impeded. The lock plate 42, which is formed in a substantially circular arc plate shape, is accommodated within the accommodating portion 40. Further, a thin disc-shaped lock cover 44 for preventing the lock plate 42 from falling off, is mounted in a state in which rotation thereof is prevented, at the outer side surface at the holding portion 24C of the lock base 24.

The lock plate 42 is formed by a plate main body 42A which is formed of metal and is formed in a substantial circular arc plate shape; a projecting portion 42B which is rectangular and juts out from one end portion of the plate main body 42A; high-strength lock teeth 42C which are formed at the outer peripheral portion of the other end portion of the plate main body 42A, and mesh with ratchet teeth 38A of the internal ratchet 38 of the first leg plate 16; and a guide pin 42D which is formed to stand at this other end portion of the plate main body 42A. Note that a length which is the sum of the width of the plate main body 42A and the projecting length of the projecting portion 42B is substantially equal to the width of a wide portion 40A of the accommodating portion 40.

A substantially disc-shaped V gear 46, whose diameter is larger than that of the lock base 24, is disposed at a position adjacent to the lock base 24. A solid cylindrical boss 48 is formed at the axially central portion of the V gear 46. The boss 48 is shaft-supported so as to be able to rotate to follow rotation of the gear holding portion 36E of the torsion bar 36. Further, a guide hole 50, which is substantially formed in the shape of a widely-opened letter "V", is formed in the V gear 46. The guide pin 42D which is formed to stand at the lock plate 42 is inserted into the guide hole 50. Moreover, lock teeth 46A are formed integrally at the outer peripheral portion of the V gear 46.

Figure 3:
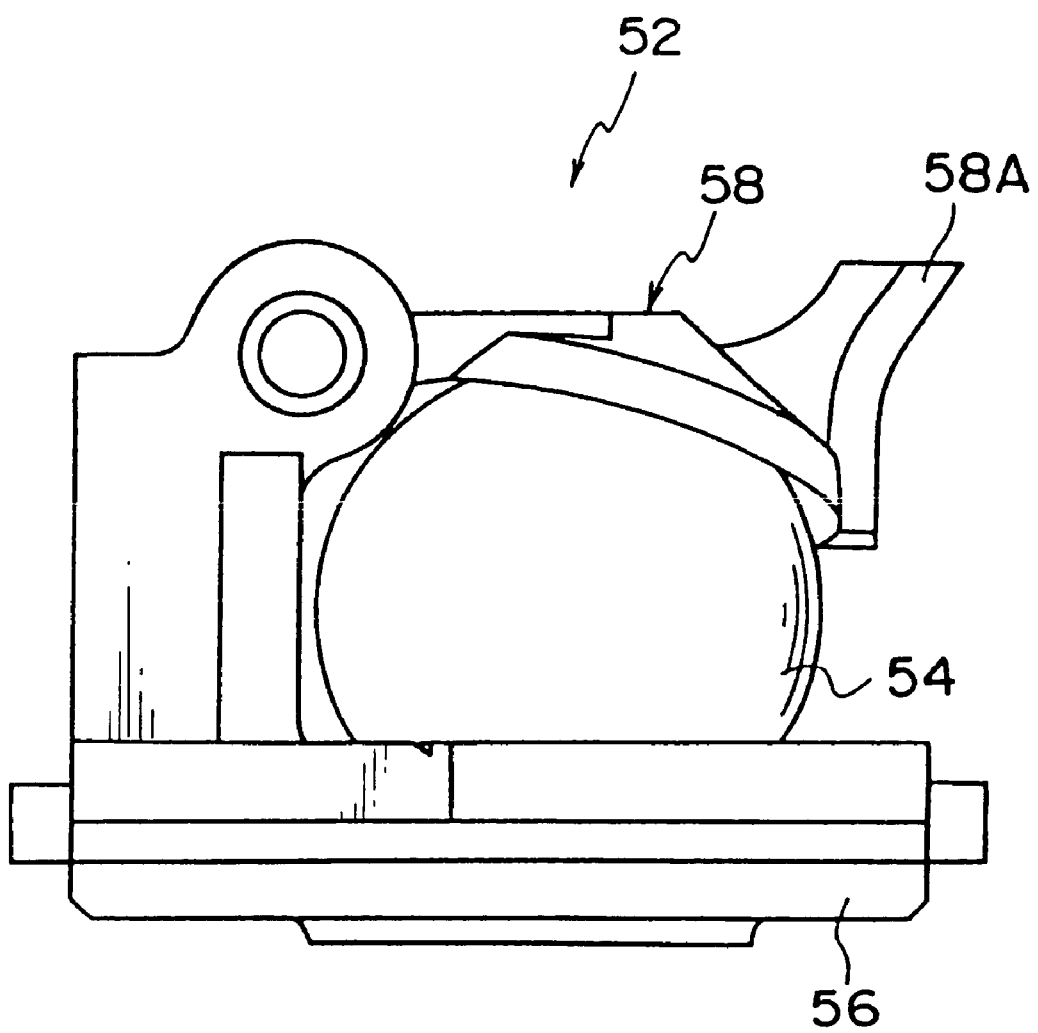
FIG. 3 is a front view showing the overall structure of an acceleration sensor which forms the webbing retractor relating to the embodiment of the present invention.

An acceleration sensor 52 for VSIR (vehicle sensitive inertia reel) which is shown in FIG. 3 is disposed beneath the V gear 46. Note that the acceleration sensor 52 is not illustrated in FIG. 1. At the time of rapid deceleration of the vehicle, a ball 54 of the acceleration sensor 52 rolls on a sensor housing 56 and swings a sensor lever 58, and a lock claw 58A of the sensor lever 58 engages with the lock tooth 46A of the V gear 46.

Figure 4:
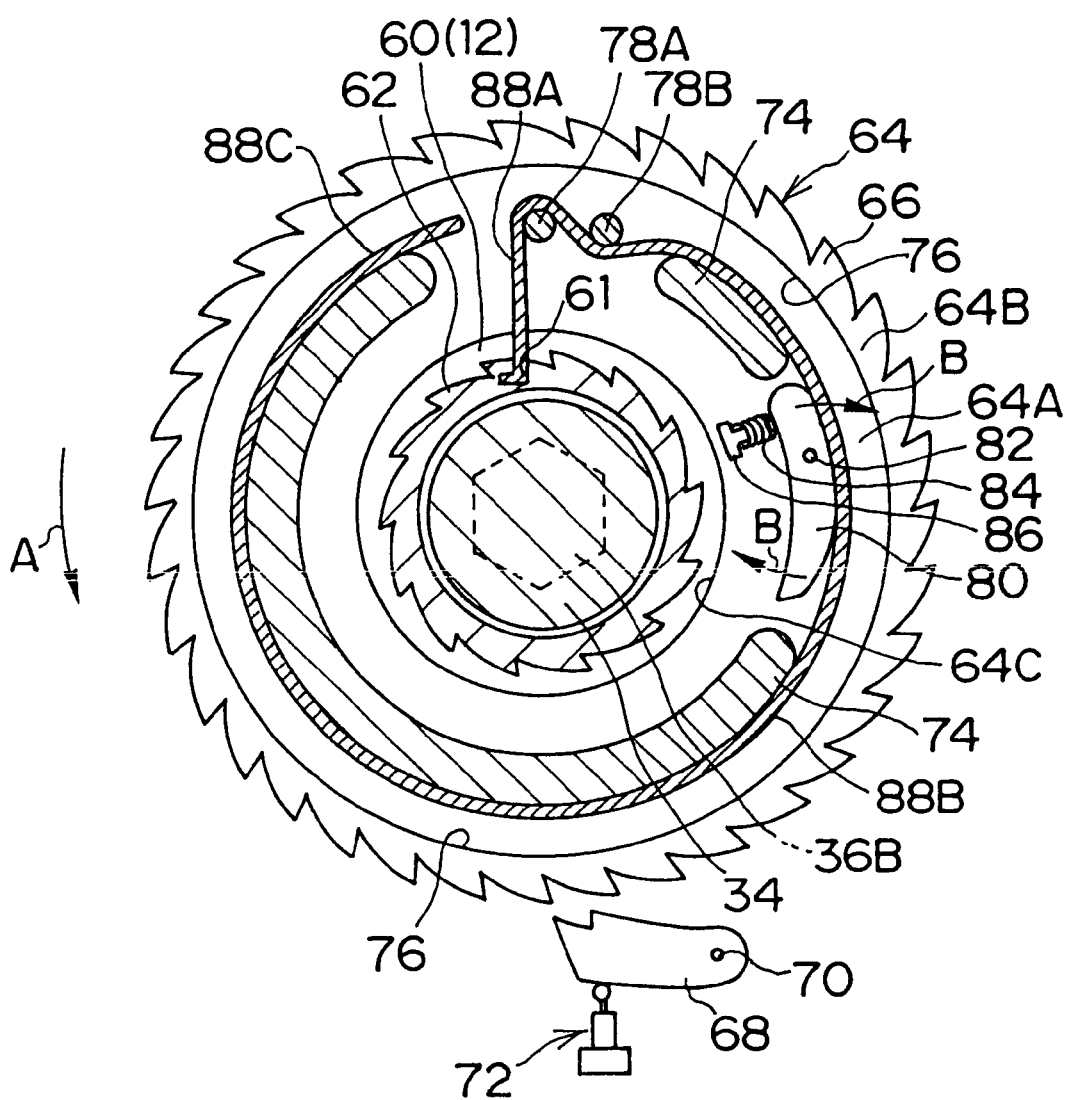
FIG. 4 is a sectional view taken along line 4—4 of FIG. 1.

As shown in FIG. 4, a hollow cylindrical portion 60, which is coaxial with the spool shaft 12A of the spool 12 and whose diameter is smaller than that of the spool shaft 12A, is formed at the outer side of the second flange portion 12C of the spool 12. Stopper teeth 62, which can impede rotation of the spool 12 in the direction of arrow A by engaging with a pawl 80 which will be described later, are formed at the outer peripheral surface of the second leg plate 18 side of the hollow cylindrical portion 60. A fixing groove 61, which is formed in a substantially reversed L shape and whose depthwise direction is the axial direction of the hollow cylindrical portion 60, is formed in the second leg plate 18 side end surface of the hollow cylindrical portion 60. The fixing groove 61 is for fixing a plate 88 which will be described later.

A gear 64, which serves as a rotating member, is provided at a side end portion of the hollow cylindrical portion 60, at which side end portion the hollow cylindrical portion 60 is connected with the second flange portion 12C. The gear 64 has a bottom portion 64A and a tubular portion 64B, and is formed in the shape of a short hollow cylinder having a bottom. A supporting hole 64C, which corresponds to the hollow cylindrical portion 60, is formed in the central portion of the bottom portion 64A. At the supporting hole 64C, the gear 64 is fit with the hollow cylindrical portion 60. In this way, with the tubular portion 64B opposing the hollow cylindrical portion 60 (the stopper teeth 62) of the spool 12, the gear 64 is supported so as to be freely rotatable and so as to be coaxial with the spool 12. Further, lock teeth 66 are formed at the outer peripheral portion of the tubular portion 64B of the gear 64.

A lock pawl 68, which can mesh with the lock teeth 66, is provided beneath the gear 64. The lock pawl 68 is supported so as to be freely rotatable in a direction along the second leg plate 18 by a supporting pin 70 which is provided in a vicinity of the lower end of the second leg plate 18. The lock pawl 68 is connected to a driving device 72 (not shown in FIG. 1). In predetermined cases (such as at the time of rapid deceleration of the vehicle, or at the time when the webbing 100 is rapidly pulled-out, or the like), the driving device 72 is operated by a control device (not shown), and the lock pawl 68 can thereby move from a position of non-engagement with the lock teeth 66 to a position of engagement. Note that the driving device 72 may be an electromagnetic actuator such as a solenoid or the like, or maybe a fluid drive type actuator such as a gas generator or the like.

Guiding projections 74, which are formed in substantially circular arc shapes which are coaxial with the bottom portion 64A of the gear 64, stand upright in a direction along the axis of the gear 64 at the bottom portion 64A of the gear 64. Guide grooves 76 are thereby formed in the gear 64 between the guiding projections 74 and the tubular portion 64B. The guiding projections 74 (guide grooves 76) are cut-out at two places which are adjacent to one another. In one of the cut-out portions, a pair of engaging pins 78A, 78B, which are formed in substantially solid cylindrical shapes, stand upright so as to be parallel to the axis of the gear 64. In the other cut-out portion, the pawl 80, which can mesh with the stopper teeth 62, is provided.

Figure 5:
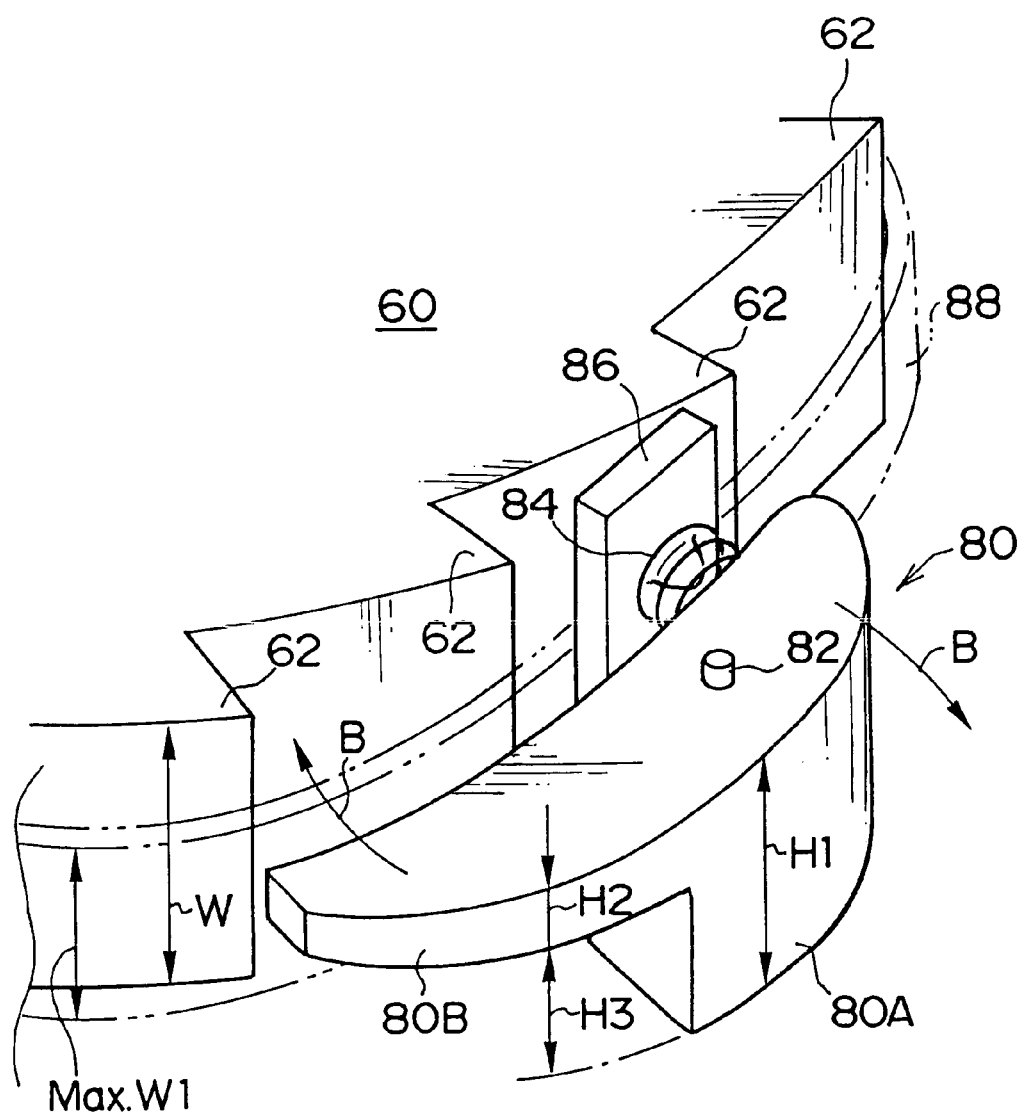
FIG. 5 is a perspective view showing the overall structure of a stopper device which forms the webbing retractor relating to the first embodiment of the present invention.

As is shown in FIG. 5, the pawl 80 is formed by a thick supporting portion 80A and a thin claw portion 80B. The supporting portion 80A is supported so as to be freely rotatable and so as to be unable to be removed, by a supporting pin 82 which stands upright at the bottom portion 64A of the gear 64. The claw portion 80B extends along the end surface of the supporting portion 80A at the side opposite to the bottom portion 64A (i.e., extends along the upper end surface in FIG. 5). Due to the pawl 80 rotating around the supporting pin 82, the claw portion 80B can move between a position at which the claw portion 80B meshes with the stopper tooth 62, and a position at which the claw portion 80B does not mesh with the stopper tooth 62. Further, one end portion of a coil spring 84 is connected to the supporting portion 80A of the pawl 80, at the side of the supporting pin 82 opposite the side thereof at which the claw portion 80B is formed. The other end portion of the coil spring 84 is fixed to a spring receiving plate 86 which stands upright at the bottom portion 64A of the gear 64. In this way, the pawl 80 is usually urged by the coil spring 84 in the direction of meshing with the stopper tooth 62 (in the direction of arrow B in FIGS. 4 and 5). Note that, in the above-described structure, the pawl 80 and the coil spring 84 correspond to the "stopper device") of the present invention.

Figure 6:
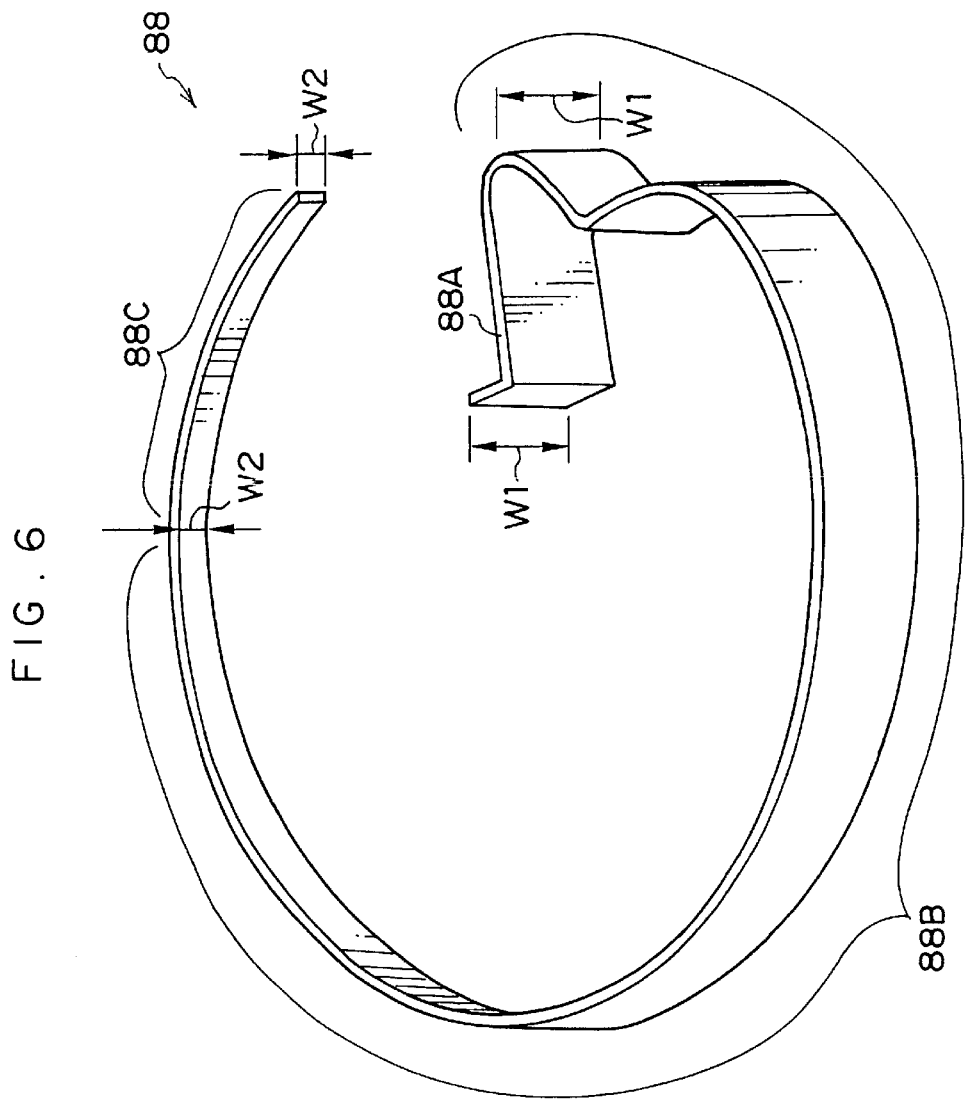
FIG. 6 is a perspective view showing the overall structure of a plate which forms the webbing retractor relating to the first embodiment of the present invention.

Further, the plate 88, which serves as an elongated member, is provided between the hollow cylindrical portion 60 (stopper teeth 62) of the spool 12 and the inner peripheral surface of the tubular portion 64B of the gear 64, which oppose one another. As shown in FIG. 6, a fixed portion 88A, which is bent in a substantially reversed L shape in correspondence with the fixing groove 61 of the spool 12, is formed at one end portion of the plate 88. The portion of the plate 88 from the intermediate portion thereof to the other end portion thereof is curved in a circular arc shape which can be accommodated within the guide grooves 76 of the gear 64. One portion of the intermediate portion is a rubbed portion 88B, and the widthwise dimension thereof gradually decreases toward the other end portion. (The widthwise dimension continuously decreases from the width W1 shown in FIG. 6 to a width W2 which is smaller than W1.) Further, the portion of the plate 88 from the final end portion of the rubbed portion 88B to the other end portion of the plate 88 is a trigger portion 88C which corresponds to the length from the engaging pin 78B to the end portion of the pawl 80 at the side thereof which connects with the coil spring 84. The widthwise dimension of the trigger portion 88C is W2 and is constant. Note that the widthwise dimension of the trigger portion 88C may be greater than W2.

The fixed portion 88A of the plate 88 is inserted and fit into the fixing groove 61 formed in the hollow cylindrical portion 60. Further, the rubbed portion 88B of the plate 88 is trained around (engaged with) the engaging pins 78A, 78B which stand upright from the bottom portion 64A of the gear 64 at the starting end portion of the fixed portion 88A side. The rubbed portion 88B and the trigger portion 88C are disposed within the guide grooves 76 of the gear 64. In this state, the pawl 80 abuts the rubbed portion 88B of the plate 88 at the radial direction outer side surface of the gear 64, and is held at a position of non-engagement with the stopper tooth 62 against the urging force of the coil spring 84.

In this way, usually, the spool 12 and the gear 64 rotate integrally via the plate 88 and the engaging pins 78A, 78B. When relative rotation in the direction of arrow A arises between the spool 12 and the gear 64, the plate 88 is taken-up around the hollow cylindrical portion 60 (the stopper teeth 62) of the spool 12. Note that a tooth width W of the stopper tooth 62 (which is substantially the same dimension as the depth of the fixing groove 61) and a height H1 of the supporting portion 80A of the pawl 80 are substantially the same. Further, a difference H3 between the height H1 of the supporting portion 80A and a height H2 of the claw portion 80B is larger than the maximum width dimension W1 of the plate 88. When the state of abutment of the pawl 80 and the trigger portion 88C of the plate 88 is cancelled, the claw portion 80B of the pawl 80 meshes with the end portion side of the stopper tooth 62 (FIG. 5).

Further, as shown in FIG. 1, a sensor holder 90 made of plastic is disposed at the outer side of the first leg plate 16 of the frame 14. A sensor cover 92, which is made of plastic and has a configuration which is similar to that of the sensor holder 90, is fit at and covers the outer side of the sensor holder 90. The sensor holder 90 and the sensor cover 92 are integral, and are mounted to the first leg plate 16 of the frame 14.

The sensor holder 90 is formed to include a holder main body portion 94 which is formed in a substantial cup shape, and a sensor holding portion 96 which is formed in a substantially rectangular frame shape and is formed at the lower edge side of the holder main body portion 94. Internal teeth 94A, which can engage with an unillustrated pawl for WSIR (webbing sensitive inertia reel) which is shaft-supported at the V gear 46, are formed integrally with the inner peripheral portion of the holder main body portion 94. Due to the pawl engaging the internal tooth 94A at the time when the webbing 100 is rapidly pulled-out, rotation of the V gear 46 in the direction of arrow A is impeded. Further, a shaft receiving portion 98, which is shaped as a hollow cylinder, is formed integrally with the axially central portion of the holder main body portion 94. The distal end portion 36F of the torsion bar 36 is supported in the shaft receiving portion 98 (see FIG. 1). Further, the acceleration sensor 52 is inserted and held in the sensor holding portion 96.

In the above-described structure, the lock plate 42 which is held in the accommodating portion 40 formed in the holding portion 24C of the lock base 24, the internal ratchet 38 which is formed in the first leg plate 16 of the frame 14, and the VSIR and WSIR including the V gear 46 which guides the lock plate 42, correspond to the "locking device" of the present invention.

Next, operation of the present embodiment will be described.

A vehicle occupant holds a tongue plate (not shown), through which the webbing 100 passes, and pulls the webbing 100 out from the spool 12 against the urging force of a power spring, and engages the tongue plate with a buckle device (not shown). In this way, the vehicle occupant is in a state in which the webbing 100 of a three-point-type seat belt device is applied to him/her. Namely, the portion of the webbing 100 from a shoulder anchor (not shown), which is provided at an upper portion of a center pillar, to the tongue plate is the shoulder side webbing 100. The portion of the webbing 100 from the tongue plate to the buckle device is the lap side webbing 100.

From this state, when, while the vehicle is traveling, the vehicle rapidly decelerates, a pretensioner (not shown) is operated, and the spool 12 is instantaneously made to rotate in the webbing take-up direction via the sleeve 34. Simultaneously, the state of a rapid deceleration of the vehicle is detected by the acceleration sensor 52. Namely, the ball 54 of the acceleration sensor 52 rolls on the sensor housing 56 and swings the sensor lever 58. In this way, the lock claw 58A of the sensor lever 58 engages with the lock tooth 46A of the V gear 46, and rotation of the V gear 46 in the direction of arrow A is impeded.

On the other hand, the spool 12 attempts to rotate in the direction of arrow A due to the webbing tensile force which is received from the vehicle occupant. Thus, relative rotation arises between the spool 12, which is attempting to rotation the direction of arrow A, and the V gear 46, whose rotation in the direction of arrow A is impeded. When relative rotation arises between these two, the guide pin 42D of the lock plate 42 which is held in the accommodating portion 40 formed in the holding portion 24C of the lock base 24 is guided within the guide hole 50 of the V gear 46, and is moved substantially toward the radial direction outer side of the lock base 24. In this way, the lock tooth 42C of the lock plate 42 meshes with the ratchet tooth 38A of the internal ratchet 38 which is provided at the first leg plate 16 of the frame 14, and rotation of the lock base 24 in the direction of arrow A is impeded. Further, simultaneously, the driving device 72 is operated, the lock pawl 68 meshes with the lock tooth 66 at the outer peripheral portion of the gear 64, and rotation of the gear 64 in the direction of arrow A is impeded.

When rotation of the lock base 24 in the direction of arrow A is impeded, the webbing tensile force which is received from the vehicle occupant is applied, as rotating force in the direction of arrow A, to the torsion bar 36 via the spool 12 and the sleeve 34. Thus, the spool 12 is rotated in the direction of arrow A while the torsion bar 36 is twisted. At this time, because rotation of the gear 64 in the direction of arrow A is impeded, relative rotation arises between the spool 12 and the gear 64. As shown in FIG. 7A, the plate 88, at the rubbed portion 88B thereof, is taken-up onto the hollow cylindrical portion 60 (the stopper teeth 62) while being rubbed by the engaging pins 78A, 78B. Energy absorption is achieved by the webbing 100 being pulled-out while the twisting load of the torsion bar 36 and the drawing load of the plate 88 are applied to the webbing 100 as force limiter load.

Here, the widthwise dimension (sectional area) of the rubbed portion 88B of the plate 88, which is rubbed by the engaging pins 78A, 78B as the spool 12 and the gear 64 rotate relatively, gradually decreases toward the trigger portion 88C side end portion. Therefore, as shown by the solid line in FIG. 8, the force limiter load in the energy absorbing process gradually decreases.

Figure 8:
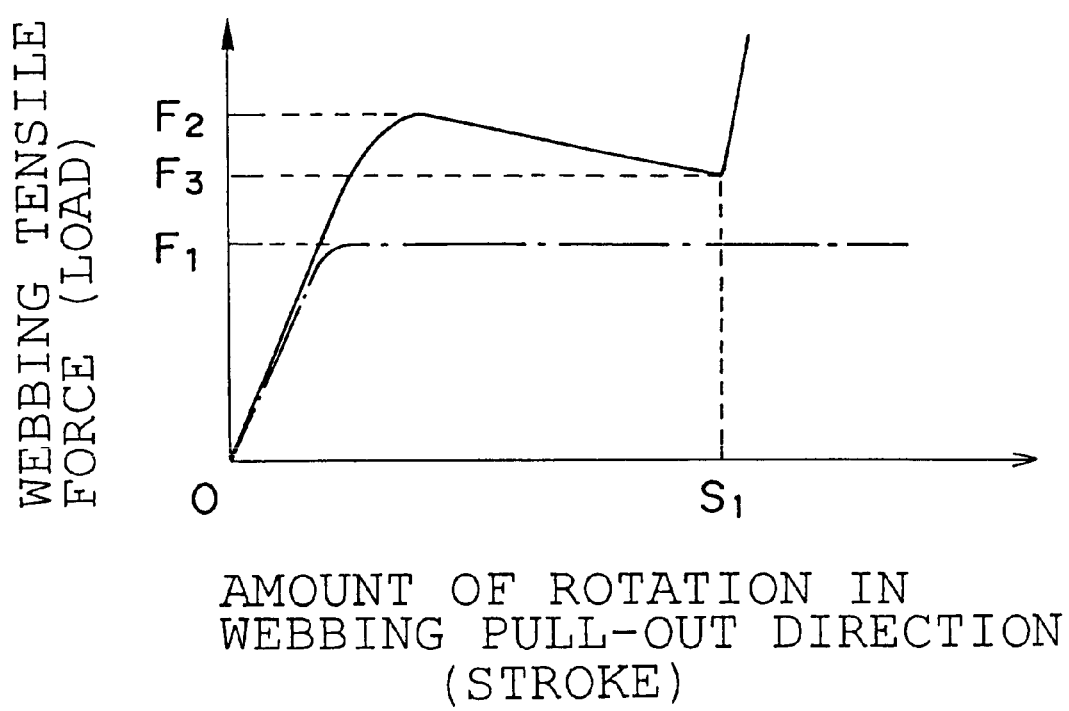
FIG. 8 is a graph showing the relationship between webbing tensile force (force limiter load) and an amount of rotation in a webbing pull-out direction, in the webbing retractor relating to the first embodiment of the present invention.

Further, when the spool 12 further rotates relatively in the direction of arrow A, and the plate 88 is taken-up on the hollow cylindrical portion 60 (the stopper teeth 62) of the spool 12, and the spool 12 is rotated by a rotational amount S1 shown in FIG. 8 (which is substantially one rotation in the present embodiment), the abutment of the pawl 80 and the trigger portion 88C formed at the final end of the rubbed portion 88B of the plate 88 is cancelled. The pawl 80 is rotated in the direction of arrow B by the urging force of the coil spring 84, and meshes with the stopper tooth 62 of the hollow cylindrical portion 60 (see FIG. 7B). In this way, relative rotation in the direction of arrow A of the spool 12 with respect to the gear 64 is impeded. At this time, because rotation of the gear 64 in the direction of arrow A is impeded by the lock pawl 68, rotation of the spool 12 in the direction of arrow A is impeded, and further pulling-out of the webbing 100 is limited.

Here, the fixed portion 88A of the plate 88 is inserted in and fixed at the hollow cylindrical portion 60 (the fixing groove 61) of the spool 12. The rubbed portion 88B of the plate 88 is trained around (engaged with) the engaging pins 78A, 78B of the gear 64. Operation is limited by the pawl 80, which is urged in the direction of arrow B by the coil spring 84, merely abutting the plate 88 (the rubbed portion 88B or the trigger portion 88C). Thus, the structure is simple. Further, because these components are provided at the outer side of the one end portion of the spool 12 which faces the second leg plate 18, there is no need to assemble lock nuts or the like in the interior of the spool 12 as in the conventional art, and the assembly process is simplified.

Further, the torsion bar 36 and the plate 88 are provided as the energy absorbing device. The twisting load of the torsion bar 36 is the base load (the load F1 shown by the one-dot chain line in FIG. 8) of the force limiter load. The drawing load of the plate 88 is a variable load. Thus, the plate 88 can be made compact, and the plate 88 and the torsion bar 36 can be set in a well-balanced arrangement within the webbing retractor 10. The webbing retractor 10 on the whole is made more compact and more lightweight. Further, as described above, a gradually changing device and a stopper device having simple structures can be obtained.

In this way, in the webbing retractor 10 relating to the present embodiment, the structure is simple, the webbing pull-out amount at the time of energy absorption can be limited, and the force limiter load in the energy absorbing process is reduced.

Note that, in the above embodiment, a case is described in which the driving device 72 is operated in accordance with VSIR when the vehicle rapidly decelerates. However, the present invention is not limited to the same. For example, the driving device 72 may be operated in accordance with WSIR at the time when the webbing 100 is rapidly-pulled out. Or, for example, a structure is possible in which the driving device 72 is not operated in a case when it is sensed by a separately provided sensor or the like that a vehicle occupant is light-weight, or in a case in which it is sensed that the travelling speed of the vehicle was low before the rapid deceleration, or the like. Further, the control device which operates the driving device 72 may be an electric control device, or may be a mechanical control mechanism.

Further, in the above-described embodiment, the hollow cylindrical portion 60 is provided at the spool 12. However, the present invention is not limited to the same. The gear 64 may be fit at and the stopper teeth 62 and the fixing groove 61 may be formed at the outer peripheral portion of the shaft member of the spool 12 (e.g., at the portion of the sleeve 18 which is not fit into the spool 12).

Next, a webbing retractor 110 relating to a second embodiment of the present invention will be described with reference to FIGS. 9 through 13. Note that parts which are basically the same as those of the webbing retractor 10 relating to the first embodiment are denoted by the same reference numerals, and description thereof is omitted. Further, in the same way as in the first embodiment, when arrow A is shown in FIGS. 9 through 13, the direction of arrow A is the webbing pull-out direction (direction of rotation).

Figure 9:
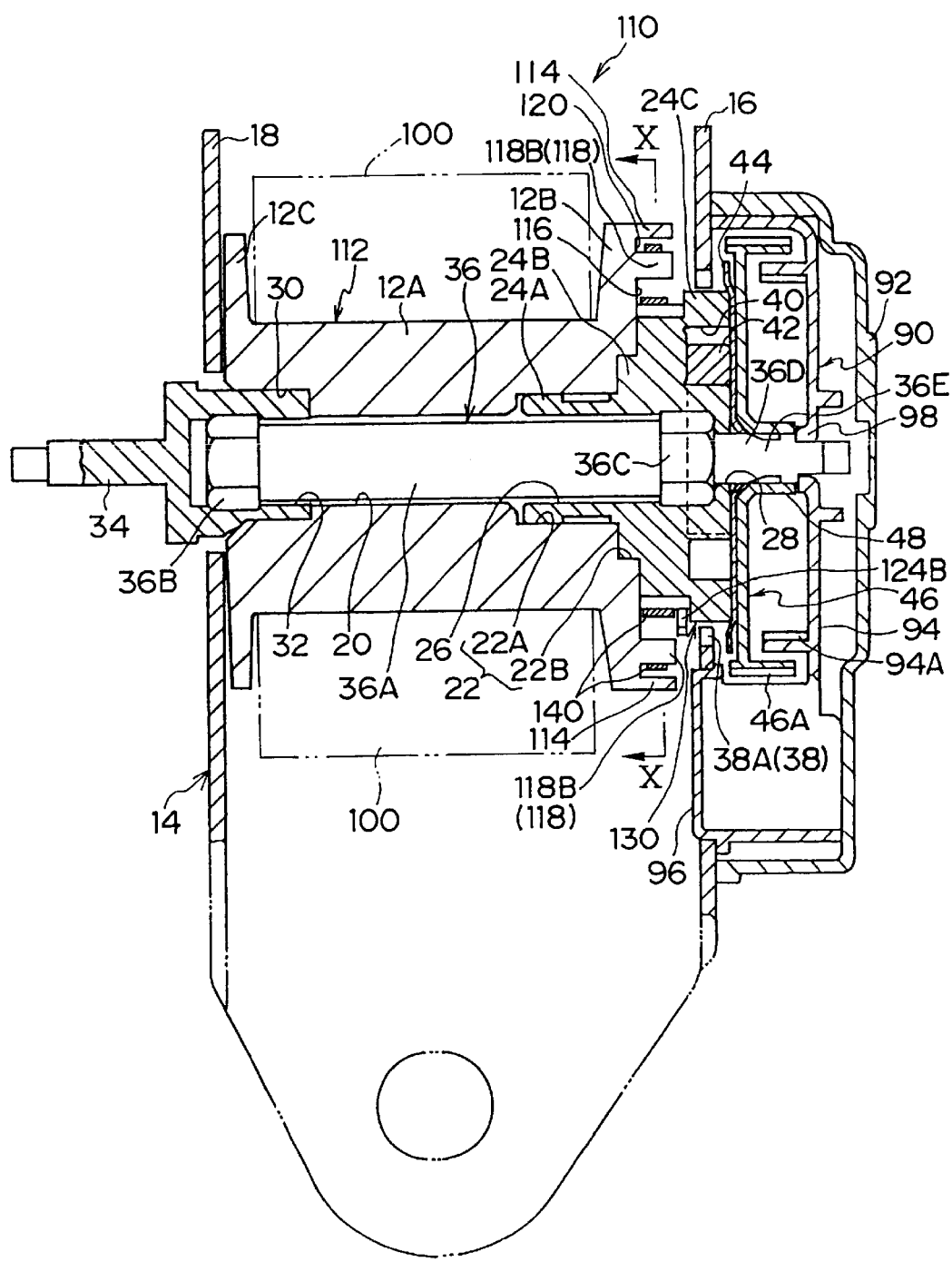
FIG. 9 is a schematic sectional view showing the overall structure of a webbing retractor relating to a second embodiment of the present invention.
Figure 10:
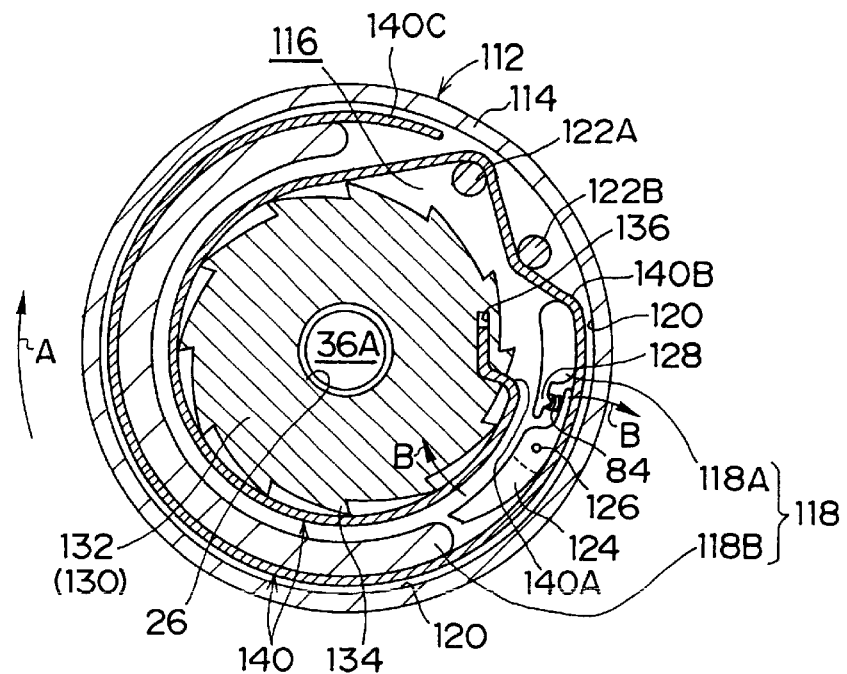
FIG. 10 is a sectional view taken along line X—X of FIG. 9.

The overall structure of the webbing retractor 110 is shown in cross-section in FIG. 9. As is shown in FIG. 9, the present embodiment differs from the previously-described first embodiment in that the gear 64, the lock teeth 66 which impede rotation of the gear 64 in the webbing pull-out direction, the lock pawl 68 and the driving device 72 are not provided, and a plate 140 and a pawl 124 which forms the stopper device and the like are disposed between a spool 112 and a lock base 130 which serves as a rotating member. Further, the present embodiment differs from the first embodiment in that one end portion of the plate 140 is fixed to the lock base 130 (rotating member) whose rotation in the direction of arrow A is impeded by a locking device. Moreover, as shown in FIG. 10, the present embodiment differs from the first embodiment also in that, in the initial state, a portion of the plate 140 is wound about the lock base 130 which fixes one end portion of the plate 140, and at the time of relative rotation between the spool 112 and the lock base 130, the direction in which the plate 140 is pulled is always substantially constant (the direction is the direction of a tangent line connecting an engaging pin 122A which will be described later and a take-up portion 132). Details will be described hereinafter.

A tubular portion 114, which runs along the outer peripheral surface of the first flange portion 12B, projects at the outer side of the first flange portion 12B of the spool 112. A guiding projection 118, which is formed in a substantial circular arc shape coaxially with an end surface 116 of the spool 112 at the tubular portion 114 inner side, stands upright in a direction along the axis of the spool 112 at the end surface 116. In this way, a guide groove 120 is formed in the spool 112 between the guiding projection 118 and the tubular portion 114. The guiding projection 118 (guide groove 120) is cut-out at two places which are adjacent to one another such that the guiding projection 118 is divided into a short circular arc shaped guiding projection 118A and a substantially semicircular arc shaped guiding projection 118B. A pair of engaging pins 122A, 122B, which are substantially solid cylinders, stand upright parallel to the axis of the spool 112 at one cut-out portion of the guiding projection 118. A pawl 124, which can mesh with stopper teeth 134 of the lock base 130 which will be described later, is provided in the other cut-out portion.

Figure 11:
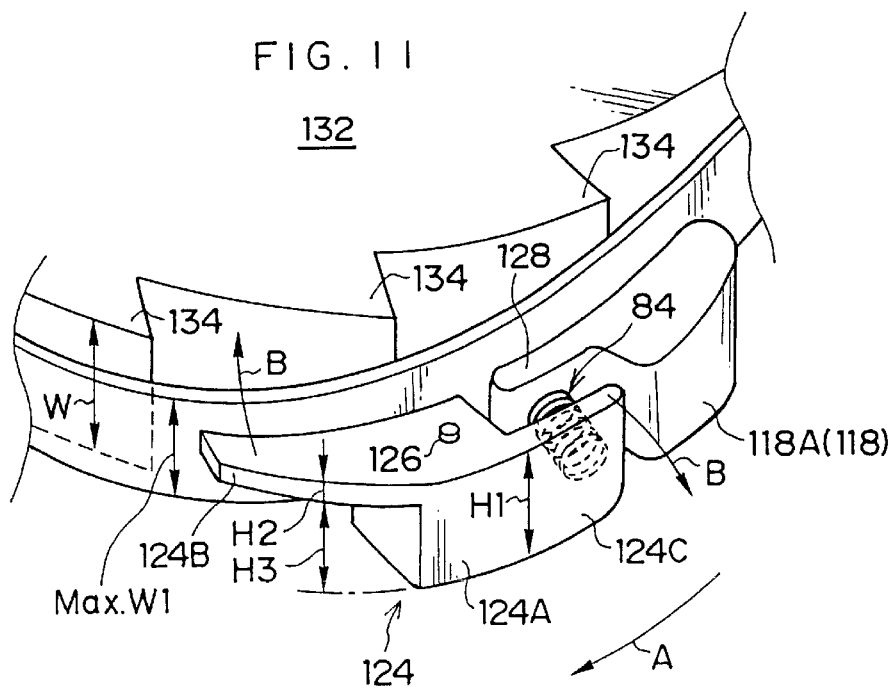
FIG. 11 is a perspective view showing the overall structure of a stopper device which forms the webbing retractor relating to the second embodiment of the present invention.

As shown in FIG. 11, the pawl 124 is formed by a thick supporting portion 124A, a thin claw portion 124B, and a spring receiving portion 124C. The supporting portion 124A is supported so as to be freely rotatable and so as to be unable to be removed, by a supporting pin 126 which stands upright at the end surface 116 of the spool 112. The claw portion 124B extends along the end surface of the supporting portion 124A at the side opposite to the end surface 116 side (i.e., extends along the upper end surface of the supporting portion 124A in FIG. 11). The spring receiving portion 124C extends along the outer surface, in the radial direction of the spool 112, of the supporting portion 124A. Due to the pawl 124 rotating around the supporting pin 126, the claw portion 124B can move between a position at which the claw portion 124B meshes with the stopper tooth 134, and a position at which the claw portion 124B does not mesh with the stopper tooth 134. Further, one end portion of the coil spring 84 is connected to the spring receiving portion 124C. The other end portion of the coil spring 84 is fixed to a spring receiving plate 128 which is formed by the outer side, in the radial direction of the spool 112, of the guiding projection 118A being cut-out. In this way, the pawl 124 is always urged by the coil spring 84 in the direction of meshing with the stopper tooth 134 (in the direction of arrow B in FIGS. 10 and 11).

Between the intermediate portion 24B and the holding portion 24C of the lock base 130, a take-up portion 132, which has an outer diameter which is between the outer diameters of the intermediate portion 24B and the holding portion 24C, is formed, and opposes the tubular portion 114 of the spool 112. The stopper teeth 134, which can impede rotation of the spool 112 in the direction of arrow A by meshing with the pawl 124, are provided at the outer peripheral portion of the take-up portion 132. Further, a substantially reversed L shaped fixing groove 136, whose depthwise direction is the axial direction of the take-up portion 132, is formed in the intermediate portion 24B side end surface of the take-up portion 132. The fixing groove 136 is for fixing the plate 140 which will be described later. Note that, in the above-described structure, the pawl 124 and the coil spring 84 correspond to the "stopper device" of the present invention.

Figure 12:
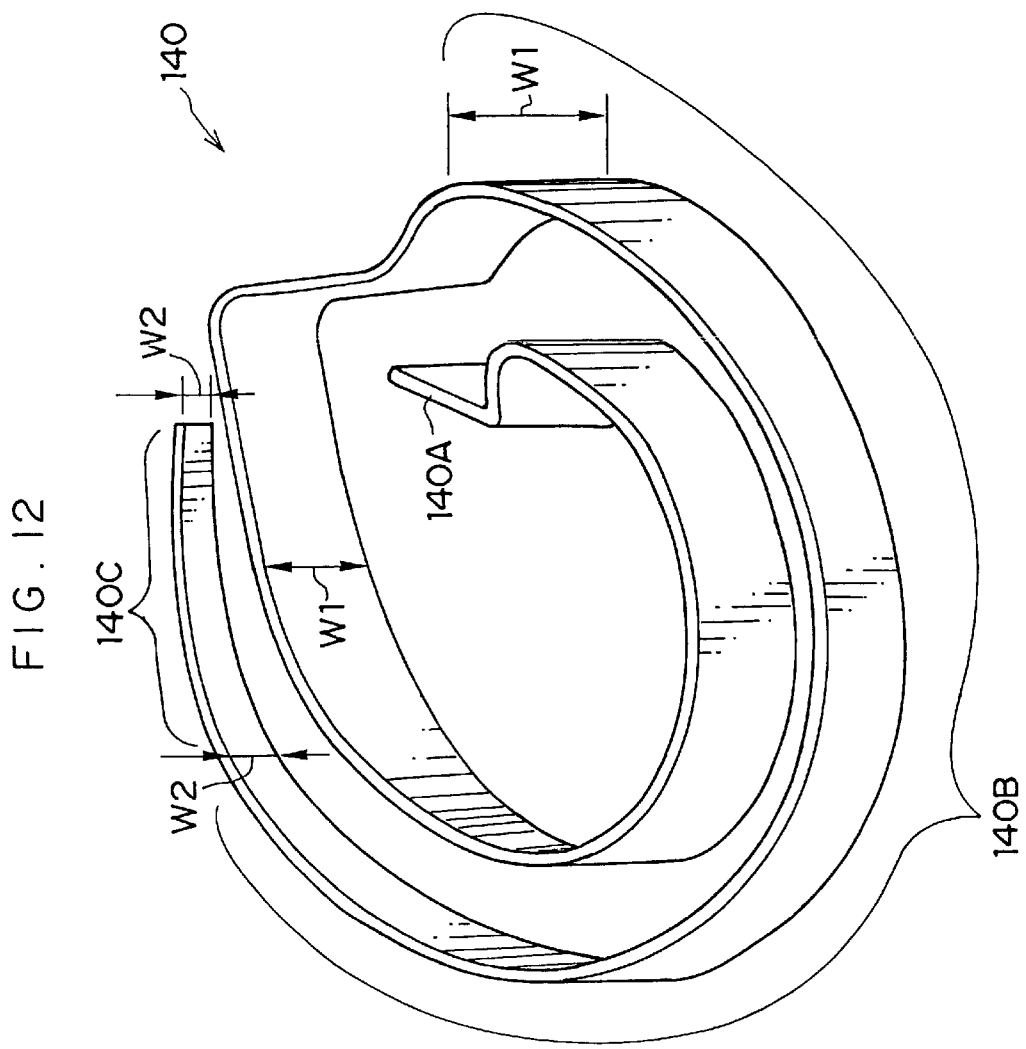
FIG. 12 is a perspective view showing the overall structure of a plate which forms the webbing retractor relating to the second embodiment of the present invention.
Figure 13A:
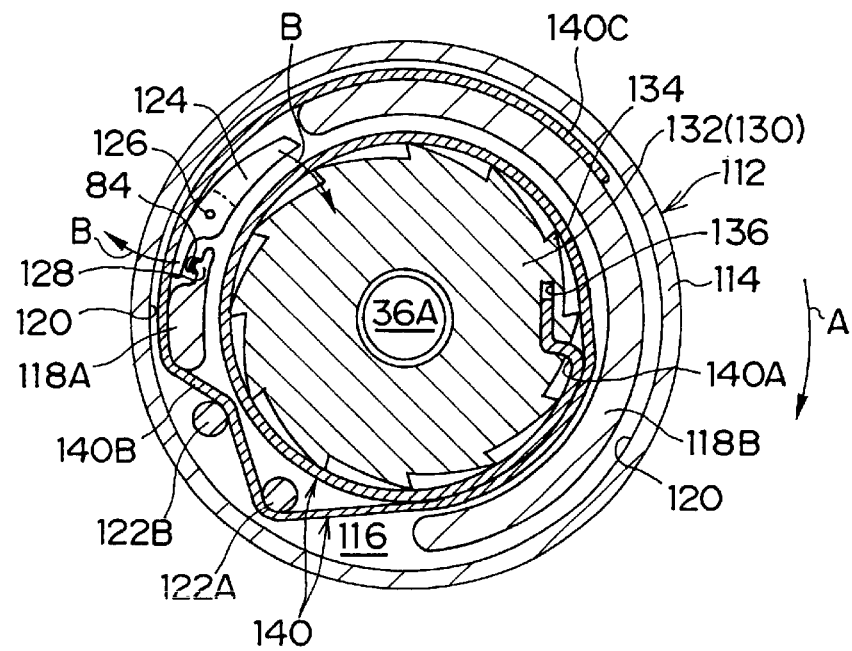
FIG. 13A is a side view, corresponding to FIG. 10, which shows an energy absorbing process.
Figure 13B:
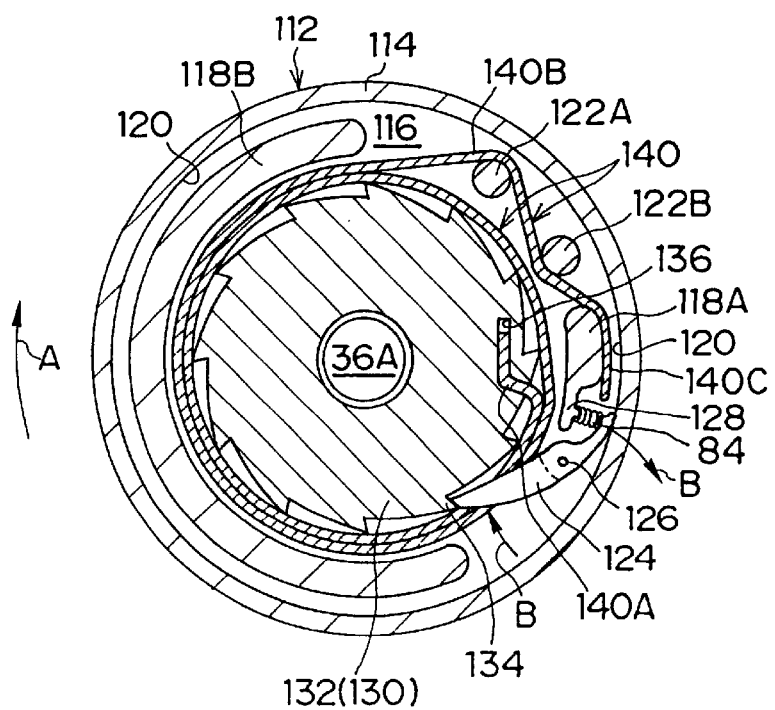
FIG. 13B is a side view, corresponding to FIG. 10, which shows an operated state of the stopper device.

The plate 140, which serves as an elongated member, is provided between the inner peripheral surface of the tubular portion 114 of the spool 112 and the take-up portion 132 of the lock base 130. As shown in FIG. 12, a fixed portion 140A, which is bent in a substantially reversed L shape in correspondence with the fixing groove 136 of the lock base 130, is formed at one end portion of the plate 140. The portion of the plate 140 from the intermediate portion thereof to the other end portion thereof is formed in a coiled form in a circular arc shape so as to be able to be accommodated within the guide groove 120 of the spool 112 while winding around the take-up portion 132. One portion of the intermediate portion is a rubbed portion 140B, and the widthwise dimension thereof gradually decreases toward the other end portion. (The widthwise dimension continuously decreases from a width W1 shown in FIG. 12 to a width W2 which is smaller than W1.) Further, the portion of the plate 140 from the final end portion of the rubbed portion 140B to the other end portion of the plate 140 is a trigger portion 140C which corresponds to the length from the engaging pin 122B to the spring receiving portion 124C end portion of the pawl 124. The widthwise dimension of the trigger portion 140C is W2 and is constant. Note that the widthwise dimension of the trigger portion 140C may be greater than W2.

The fixed portion 140A of the plate 140 is inserted and fit into the fixing groove 136 formed in the take-up portion 132. Further, in the state in which the intermediate portion of the plate 140 between the fixed portion 140A and the rubbed portion 140B is wound substantially one time around the outer peripheral portion of the take-up portion 132 (the stopper teeth 134), the rubbed portion 140B is trained around the engaging pins 122A, 122B, and the remainder of the rubbed portion 140B and the trigger portion 140C are disposed within the guide groove 120. In this state, the pawl 124 abuts the rubbed portion 140B of the plate 140 at the spool 112 radial direction outer side surface, and the pawl 124 is held in the state of non-engagement with the stopper teeth 134 against the urging force of the coil spring 84.

In this way, usually, the spool 112 and the lock base 130 rotate integrally via the torsion bar 36 and the sleeve 34. When relative rotation in the direction of arrow A arises between the spool 112 and the lock base 130, the plate 140 is taken-up in a roll form around the take-up portion 132 (the stopper teeth 134) of the lock base 130. Note that a tooth width W of the stopper tooth 134 and a height H1 of the supporting portion 124A of the pawl 124 are substantially the same. Further, a difference H3 between the height H1 of the supporting portion 124A and a height H2 of the claw portion 124B is larger than the maximum width dimension W1 of the plate 140 (which is substantially the same as the depth of the fixing groove 136). When the state of abutment of the pawl 124 and the trigger portion 140C of the plate 140 is cancelled, the claw portion 124B of the pawl 124 meshes with the end portion side of the stopper tooth 134 (see FIG. 11).

In the webbing retractor 110 having the above-described structure, the same operation and effects as those of the previously-described first embodiment are achieved. Namely, at the time of rapid deceleration of the vehicle, when rotation, in the direction of arrow A, of the lock base 130, which also serves as the rotating member, is impeded, the torsion bar 36 twists. Due to the relative rotation between the spool 112 and the lock base 130 which accompanies this twisting of the torsion bar 36, the plate 140 is rubbed, and energy absorption is achieved (see FIG. 13A). Further, due to the widthwise dimension of the plate 140 gradually decreasing, the force limiter load in the energy absorbing process decreases as shown by the solid line in FIG. 8. Moreover, after a predetermined amount of rotation of the spool 112 is permitted (the rotational amount S1 in FIG. 8, which is substantially one rotation in the present embodiment), the stopper device is operated, and further pulling-out of the webbing 100 is restricted (see FIG. 13B).

Here, because the lock base 130 also functions as the rotating member, the number of parts can be reduced. (The gear 64, the lock pawl 68 impeding rotation of the gear 64 in the direction of arrow A, the supporting pin 70, and the driving device 72 in the first embodiment can be omitted.) The structure is simplified even more, the assembly process is simplified even more, and the webbing retractor 110, which is low cost and more compact and lighter weight, can be achieved.

Further, due to the plate 140 being trained around the take-up portion 132 in advance, the direction of pulling the plate 140 is substantially constant from the initial stage of energy absorption (and substantially coincides with the direction of a tangent line connecting the engaging pin 122A and the outer peripheral surface of the take-up portion 132). A stable force limiter load characteristic (the characteristic shown in FIG. 8) can be achieved, and the force limiter load in the energy absorbing process can be reliably decreased.

Further, the second embodiment is structured such that the plate 140 is wound around the take-up portion 132 in advance. However, the present invention is not limited to the same. As in the first embodiment, a structure in which the plate 140 is not wound around the take-up portion 132 in advance is possible. Further, the first embodiment may be structured such that the plate 88 is wound by a predetermined amount around the hollow cylindrical portion 60 in advance.

The above-described first and second embodiments are preferable structures which are provided with the torsion bar 36 and the plate 88 or the plate 140. However, the present invention is not limited to the same. It is possible for the webbing retractors 10, 110 to not include the torsion bar 36. Or, a separate energy absorbing device (e.g., a wire or a brake spring or the like which is trained around the spool and the rotating member) may be provided instead of the torsion bar 36, or in addition to the torsion bar 36.

Further, the plates 88, 140 are used as the elongated members in the above-described first and second embodiments. However, the present invention is not limited to the same, and, for example, a wire or the like may be used as the elongated member. The way of decreasing the surface area of the elongated member (e.g., the plate 88 or the like) is not limited to decreasing the widthwise dimension thereof, and the thickness dimension may be decreased, or both the width and the thickness may be decreased. Further, in a case in which a wire is used as the elongated member, the diameter may be decreased, or the wire may be cut-out at a slant with respect to the axis. Further, the position at which the plates 88, 140 are disposed is not limited to one end portion of the spool, and for example, the plate 88 may be disposed within the spool shaft 12A of the spool 12.

The first and second embodiments are provided with the coil spring 84 for urging the pawls 80, 124 in the direction of arrow B. However, the present invention is not limited to the same, and, for example, the pawl 80 may be urged by a plate spring or by magnetism or the like.

Moreover, in the above-described first and second embodiments, the pair of engaging pins 78A, 78B or 122A, 122B are provided as the engaging portion of the plate 88. However, the present invention is not limited to the same. In accordance with the desired force limiter load, for example, one or three or more engaging pins 78A may be provided. Further, the configuration of the engaging pin 78A and the like is not limited to a solid cylindrical configuration, and, for example, the engaging pin 78A and the like may be formed in a desired shape such as a rectangular shape or a flat oval shape or the like.

In the first and second embodiments, the webbing retractors 10, 110 are provided with both a VSIR and a WSIR as the locking device. However, the present invention is not limited to the same. It is possible for the webbing retractors 10, 110 to be provided with only either one of a VSIR or a WSIR. Further, the lock plate 42 is not limited to the structure thereof in the first and second embodiments in which the lock plate 42 is provided at one end side of the spool 12, 112 and is substantially circular arc shaped.

As described above, the webbing retractor relating to the present invention has the excellent effects that, the structure thereof is simple, the webbing pull-out amount at the time of energy absorption can be limited, and the force limiter load in the energy absorbing process can be reduced.

What is claimed is:

1. A webbing retractor comprising:
 a spool on which a webbing is taken-up and from which a webbing is pulled-out;
 a rotating member provided so as to be coaxial with the spool and so as to be rotatable relative to the spool, the rotating member usually rotating integrally with the spool, and in predetermined cases, rotation of the rotating member in a webbing pull-out direction is impeded;
 an elongated member whose first end portion is fixed to one of the spool and the rotating member, and whose intermediate portion is engaged with another of the spool and the rotating member, and when rotation of the rotating member in the webbing pull-out direction is impeded, accompanying relative rotation of the spool and the rotating member, the elongated member is rubbed at an engaged region thereof; and
 a stopper device provided at the spool or the rotating member with which the intermediate portion is engaged so as to abut the intermediate portion of the elongated member, and when, accompanying relative rotation of the spool and the rotating member, a state of abutment of the stopper device with the elongated member is cancelled, the stopper device impedes relative rotation, in the webbing pull-out direction, of the spool with respect to the rotating member.

2. A webbing retractor according to claim 1, wherein the elongated member is disposed between an outer peripheral portion of the one of the spool and the rotating member and an inner peripheral portion of the spool or the rotating member with which the intermediate portion is engaged, the outer peripheral portion and the inner peripheral portion opposing one another, and accompanying relative rotation of the spool and the rotating member, the elongated member is taken-up onto the outer peripheral portion of the one of the spool and the rotating member.

3. A webbing retractor according to claim 1, wherein, at the elongated member, a sectional area of the intermediate portion which is rubbed at least at an engaged region of the intermediate portion decreases gradually toward second end portion of the elongated member.

4. A webbing retractor according to claim 3, further comprising an urging device receiving portion provided on the rotating member, wherein the stopper device includes a pawl and an urging device, the pawl whose end portion is rotatably supported on a surface of the rotating member, the urging device provided between the pawl and the urging device receiving portion.

5. A webbing retractor according to claim 1, further comprising:
- a lock device provided coaxially with the rotating member;
- a lock base provided at the first end side of the spool so as to be coaxial with the spool and so as to be able to rotate relatively with respect to the spool, and when one of a rapid deceleration of a vehicle and rapid pulling-out of a webbing is sensed, rotation of the lock base in the webbing pull-out direction is impeded by the locking device; and
- a torsion bar provided within the spool and coaxially with the spool, one end portion of the torsion bar being connected to the spool and another end portion of the torsion bar being connected to the lock base, the torsion bar usually being made to rotate integrally with the spool and the lock base, and when rotation of the lock base in the webbing pull-out direction is impeded, the torsion bar, while twisting due to tensile force of the webbing, rotates the spool in the webbing pull-out direction relatively to the lock base.

6. A webbing retractor according to claim 5, wherein the lock base also functions as the rotating member.

7. A webbing retractor according to claim 6, wherein the spool includes substantially arc guiding projections coaxial with the spool, and the stopper device includes a pawl and an urging device, the pawl whose end portion is rotatably supported on a surface of the gear, the urging device provided between the pawl and the urging device receiving portion.

8. A webbing retractor comprising:
- a spool on which a webbing is taken-up and from which a webbing is pulled-out;
- a gear provided so as to be coaxial with the spool and so as to be rotatable relative to the spool, the gear usually rotating integrally with the spool, and in predetermined cases, rotation of the gear in a webbing pull-out direction is impeded;
- an elongated member whose first end portion is fixed to the spool, and whose intermediate portion is engaged with the gear, and when rotation of the gear in the webbing pull-out direction is impeded, accompanying relative rotation of the spool and the gear, the elongated member is rubbed at an engaged region thereof; and
- a stopper device provided at the gear so as to abut the intermediate portion of the elongated member, and when, accompanying relative rotation of the spool and the gear, a state of abutment of the stopper device with the elongated member is cancelled, the stopper device impedes relative rotation, in the webbing pull-out direction, of the spool with respect to the gear.

9. A webbing retractor according to claim 8, wherein the elongated member is disposed between an outer peripheral portion of the spool and an inner peripheral portion of the gear, the outer peripheral portion and the inner peripheral portion opposing one another, and accompanying relative rotation of the spool and the gear, the elongated member is taken-up onto the outer peripheral portion of the spool.

10. A webbing retractor according to claim 8, wherein, at the elongated member, a sectional area of the intermediate portion which is rubbed at least at an engaged region of the intermediate portion decreases gradually toward second end portion of the elongated member.

11. A webbing retractor according to claim 10, further comprising an urging device receiving portion provided on the gear, wherein the stopper device includes a pawl and an urging device, the pawl whose end portion is rotatably supported on a surface of the gear, the urging device provided between the pawl and the urging device receiving portion.

12. A webbing retractor according to claim 11, wherein the urging device is a coil spring.

13. A webbing retractor according to claim 8, further comprising:
- a lock device provided coaxially with the gear;
- a lock base provided at the first end side of the spool so as to be coaxial with the spool and so as to be able to rotate relatively with respect to the spool, and when one of a rapid deceleration of a vehicle and rapid pulling-out of a webbing is sensed, rotation of the lock base in the webbing pull-out direction is impeded by the locking device; and
- a torsion bar provided within the spool and coaxially with the spool, one end portion of the torsion bar being connected to the spool and another end portion of the torsion bar being connected to the lock base, the torsion bar usually being made to rotate integrally with the spool and the lock base, and when rotation of the lock base in the webbing pull-out direction is impeded, the torsion bar, while twisting due to tensile force of the webbing, rotates the spool in the webbing pull-out direction relatively to the lock base.

14. A webbing retractor according to claim 11, further comprising a frame including a pair of leg plates fixed to a vehicle body, wherein the lock device includes a lock plate held at a portion of the lock base, a ratchet formed at one of the leg plates of the frame, and a V gear provided coaxial with and adjacent to the lock base, the V gear having a larger diameter than the lock base.

15. A webbing retractor comprising:
- a spool on which a webbing is taken-up and from which a webbing is pulled-out;
- a lock base provided so as to be coaxial with the spool and so as to be rotatable relative to the spool, the lock base usually rotating integrally with the spool, and in predetermined cases, rotation of the lock base in a webbing pull-out direction is impeded;
- an elongated member whose first end portion is fixed to the lock base, and whose intermediate portion is engaged with the lock base, and when rotation of the lock base in the webbing pull-out direction is impeded, accompanying relative rotation of the spool and the lock base, the elongated member is rubbed at an engaged region thereof; and
- a stopper device provided at the lock base so as to abut the intermediate portion of the elongated member, and when, accompanying relative rotation of the spool and the lock base, a state of abutment of the stopper device with the elongated member is cancelled, the stopper device impedes relative rotation, in the webbing pull-out direction, of the spool with respect to the lock base.

16. A webbing retractor according to claim 15, wherein the elongated member is disposed between an outer peripheral portion of the lock base and an inner peripheral portion of the spool, the outer peripheral portion and the inner peripheral portion opposing one another, and accompanying relative rotation of the spool and the lock base, the elongated member is taken-up onto the outer peripheral portion of the lock base.

17. A webbing retractor according to claim 16, wherein the spool includes substantially arc guiding projections coaxial with the spool, and the stopper device includes a pawl and an urging device, the pawl whose end portion is rotatably supported on a surface of the gear, the urging device provided between the pawl and the urging device receiving portion.

18. A webbing retractor according to claim 17, wherein the urging device is a coil spring.

19. A webbing retractor according to claim 15, wherein, at the elongated member, a sectional area of the intermediate portion which is rubbed at least at an engaged region of the intermediate portion decreases gradually toward second end portion of the elongated member.

20. A webbing retractor according to claim 15, further comprising:

a lock device provided coaxially with the lock base wherein, when one of a rapid deceleration of a vehicle and rapid pulling-out of a webbing is sensed, rotation of the lock base in the webbing pull-out direction is impeded by the locking device; and a torsion bar provided within the spool and coaxially with the spool, one end portion of the torsion bar being connected to the spool and another end portion of the torsion bar being connected to the lock base, the torsion bar usually being made to rotate integrally with the spool and the lock base, and when rotation of the lock base in the webbing pull-out direction is impeded, the torsion bar, while twisting due to tensile force of the webbing, rotates the spool in the webbing pull-out direction relatively to the lock base.

\* \* \* \* \*